(No Model.)
F. D. METCALF.
KETTLE TILTER.
No. 560,732. Patented May 26, 1896.
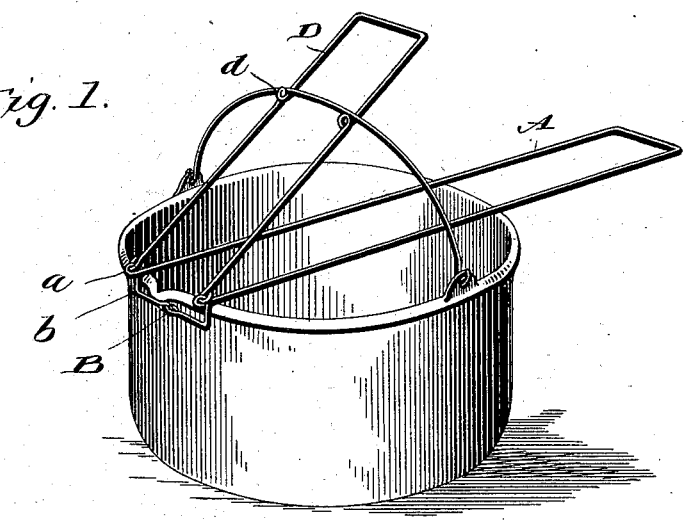
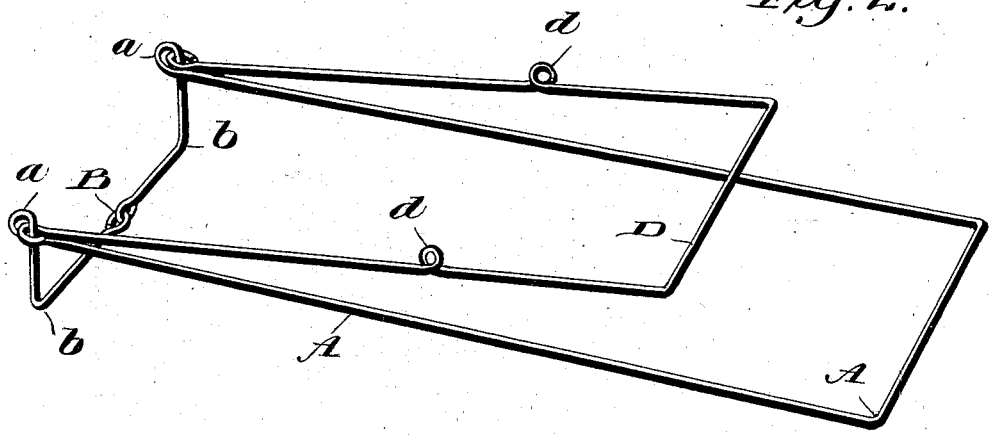
Witnesses:
L. C. Hilly
A. L. Hough
Inventor:
F. D. Metcalf,
by Franklin H. Hough
Atty.

United States Patent Office.

FRANK DWELLE METCALF, OF GASPORT, NEW YORK.

KETTLE-TILTER.

SPECIFICATION forming part of Letters Patent No. 560,732, dated May 26, 1896.

Application filed March 6, 1896. Serial No. 582,118. (No model.)

*To all whom it may concern:*

Be it known that I, FRANK DWELLE METCALF, a citizen of the United States, residing at Gasport, in the county of Niagara and State of New York, have invented certain new and useful Improvements in Kettle-Tilters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in kettle-tilters, and especially to a device made of two pieces of wire by which a kettle may be tilted without the necessity of the operator taking hold of the handle of the kettle.

A further purpose of the invention is to avoid any burning of the hands of the operator from steam issuing from a kettle while its contents are being turned out when using a tilter, the latter, to accomplish this purpose, having but one bail with its ends connected together and bent down so as to engage over the edge of the kettle, and the provision of a second wire having loops over which the kettle-handle is designed to rest, while the bail tilts the same.

To these ends and to such others as the invention may pertain the same consists, further, in the novel construction, combination, and adaptation of the parts, as will be hereinafter more fully described, and then specifically defined in the appended claim.

I clearly illustrate my invention in the accompanying drawings, which, with the letters of reference marked thereon, form a part of this specification, and in which drawings similar letters of reference indicate like parts throughout both views, in which—

Figure 1 is a perspective view of a kettle having applied thereto my improved tilter. Fig. 2 is an enlarged view of the tilter.

Reference now being had to the details of the drawings by letter, A designates a bail, made of one piece of wire, each portion of the bail being bent at the points $a$, forming eyes, and the wire extended at right angles to the elongated bail portion, thence turned inwardly at the point $b$ and the ends secured together at B, thus keeping the bail-wire or the ends thereof from spreading.

D is a one-piece wire, bent at any suitable portions to form the eyes $d$, preferably between the middle and the outer free end of the wire, and the ends of this wire are hooked and engage in the eyes $a$.

The operation of the tilter is as follows: The bail A is placed over the edge of the top of the kettle, having the downwardly-turned connected ends thereof engaging over the edge of the kettle, the bail being at right angles to the handle of the kettle to be tilted. The handle of the kettle is then thrown over on the wire D and against the eyes $d$, and the operator with the right hand holds the bail against the top of the kettle, while with the left hand the wire D raises the latter, with the handle of the kettle bearing against the eyes $d$, and the kettle is easily and quickly tilted without the necessity of the operator taking hold of the heated handle, as will be readily seen and understood.

Having thus described my invention, what I claim to be new, and desire to secure by Letters Patent, is—

A kettle-tilter, consisting of the bail A having its ends bent together in a plane at right angles to its elongated portion, the eyes $a$ formed at the angles therein, combined with the wire D, having its ends secured in said eyes $a$, and provided with the rests $d$, against which the kettle-handle is adapted to bear, all substantially as shown and described.

In testimony whereof I affix my signature in presence of two witnesses.

FRANK DWELLE METCALF.

Witnesses:
  JOHN SPROUT,
  S. C. FERRIS.